United States Patent Office 3,100,909
Patented Aug. 20, 1963

3,100,909
AGGLOMERATED FOOD PRODUCT AND
METHOD FOR MAKING THE SAME
Abraham Schapiro, Kentfield, Calif., assignor, by mesne assignments, to Roto-Dry Corporation, a corporation of California
No Drawing. Filed Jan. 30, 1961, Ser. No. 85,512
17 Claims. (Cl. 99—78)

This invntion relates to a method of treating and combining two or more water-soluble, water-absorptive or water-dispersible food solids to provide a novel, granular, agglomerated food product having advantageous physical and physical-chemical properties. For example, my end product is in a granular state in which the constituents are united in the form of small agglomerates or clusters; it has a marked resistance to deterioration by atmospheric moisture; and it readily dissolves or disperses in water without forming lumps or hard gels.

The invention, as will be apparent, relates not only to a method for preparing the agglomerates but also to a product produced by that method, i.e., to a solid, granular, agglomerated, food product having properties such as those noted above.

The invention also has application to the production of nonfood products of a composite character, wherein the components are water-soluble, water-absorptive or water-dispersible.

This application is a continuation-in-part of my copending application Serial No. 712,649, filed February 3, 1958, entitled "Food Product and the Like," now abandoned.

There is an increasing trade demand for prepared dry, granular free flowing food mixes which can be added to hot or cold water, milk, or other liquids, or combined in some cases with other food ingredients, to produce quickly a food product which is ready for consumption. A wide variety of food mixtures may be prepared by this invention. The granular clusters of this invention pour easily; they contain enough internal moisture that they do not form a dust; they are remarkably resistant to atmospheric moisture; and they dissolve very quickly, even with no agitation, in cold water.

I have discovered that it is possible to produce a variety of water-soluble and/or water-dispersible food products by forming a mixture of two or more water-soluble, water-absorptive or water-dispersible food solids in the presence of an aqueous or hydrophilic, tacky bonding agent derived from the other ingredients by solution in water or other dispersing liquid mixing until a granular mass of agglomerates or clusters are formed, each of which contains all of the ingredients in the mix; and then subjecting the mass to heat and a tumbling action whereby to remove surface moisture without overheating, and to thereby provide a dry, free-flowing, readily dispersible granular product.

In more detail, an initially slightly tacky, moist granular mass is formed which is then subjected to a low temperature thermal conditioning treatment. In this thermal conditioning treatment the granules are subjected to heat, preferably radiant heat, while being tumbled to expose fresh surfaces to the action of the heat. This thermal conditioning step removes most but not all of the moisture. The phrase "thermal conditioning step" is used advisedly because this important step is not a mere drying step. Surface moisture is evaporated but some of the surface moisture migrates into the body of the granules and is held absorptively and/or adsorptively and/or as water of crystallization in such a way that a friable product results. In this friable product any lumps are easily broken up into small granules.

It may be stated that the moisture content of the granules is sufficiently low that the product is seemingly dry, friable, and can be poured easily, yet the moisture content (virtually all of which is present as internal moisture) is sufficient to render the product quickly soluble and non-dusting. Too much moisture impairs the desired free flowing qualities and too little moisture renders the granules too hard and too slow to dissolve in water. Generally a total moisture content of about 1 to 6 percent based on the weight of product is preferred. This moisture, which I will call internal or bound moisture, aids to disperse the product, and also serves with the soluble ingredients as a binder to hold together small particles of the several ingredients in the form of clusters or agglomerates, each cluster or agglomerate containing all of the components of the mixture.

Glycerine or other hydrophilic liquids may replace all or part of the water in the bonding agent.

By this means a granular product is obtained which has several advantageous properties. Thus, each granule is a cluster of small particles or crystals of the several food ingredients which are bonded together by the tacky binding agent formed by internal water and the water-soluble ingredients. The granular mixture is free-flowing, yet it does not readily form a dust, nor does it pick up moisture readily from the air. The properties adapt this material to high speed packaging machines and also to use in dispensing machines where small unit quantities are dispensed. The product is also readily soluble or dispersible in water, either in hot or in cold, depending upon the specific ingredients.

The initial blending and mixing operation of the ingredients of my invention may be carried out in several ways, such as the following:

Example 1

Solid food ingredient A and an aqueous solution or dispersion of solid food ingredient B are mixed, as by adding A first to a blender and then adding the aqueous solution or dispersion of B. The proportion will be such that after thorough blending, a moist and tacky but granular mix results.

In Example 1 solid food ingredient A may be any one or a mixture of the following: a starch product including unmodified potato starch, unmodified tapioca starch, unmodified corn-starch, unmodified sago starch; modified potato, tapioca, corn and sago starches which dissolve or thicken at lower temperatures than the unmodified starches or whose solutions have lower viscosities; pregelatinized starch, dextrins and amylose; a sugar including dextrose, sucrose, lactose, corn syrup solids; a proteinaceous food derivative having when moistened adhesive, binding or thickening properties, including wheat gluten, pectin, amylopectin, casein, casein salts, gelatin.

Examples of aqueous solutions or dispersions of solid food ingredients B are tomato paste, orange concentrate, lemon concentrate, pureed fruits and vegetables, concentrated milk products including condensed whole milk, condensed skim milk, condensed cream, single-strength cream, half-and-half milk and cream, and condensed whey. It will be understood also that part or all of the water in these solutions or dispersions of food solids may be replaced by glycerine, propylene glycol or syrups of sorbitol, glucose, invert sugars, molasses, etc.

Example 2

Solid food ingredient C and solid food ingredient D are added to a blender and water is added in quantity sufficient to form, upon thorough blending, a granular, moist tacky mixture. Instead of water, a water-miscible solvent such as glycerine, propylene glycol, ethyl alcohol or ethyl acetate may be used, either alone or in admixture with water. Also mixtures of these solvents may be used.

Food ingredients C and D in Example 2 are any of the solids listed under A above and any of the food solids listed as dispersions under B above.

The blended, moist, tacky granular mix produced as described under either Example 1 or Example 2 is then further subjected to a thermal conditioning step which consists of subjecting the material to surface drying while the mass is being constantly stirred and tumbled to bring up fresh moist surfaces of the agglomerated particles or clusters for drying off the surface moisture. I prefer to employ radiant heat as the source of heat, and to subject the blend to a gentle tumbling action of a character which does not disintegrate the clusters or agglomerates, but which continuously brings fresh portions of the mixture into contact with the heat. Preferably, a low velocity current of air is passed over the mixture during agitation and heating. For this purpose I prefer to use an upwardly inclined trough type screw conveyor which has interrupted flights of a character such that each screw segment will lift a portion of the mass a distance forwardly and upwardly, then allow the mass to rest or to slip back to be picked up by another flight, to commingle with a later portion of the mass and to move forwardly. A trough is provided under and partly around the screws, and infrared lamps are disposed above the screws. Alternatively, the thermal conditioning step may be carried out by tumbling in a vacuum. The temperature of the food material is held low to avoid loss or change of flavor, and in general ranges from 75° to 180° F.

In generalized Examples 1 and 2, I have described a batch operation in which the granular mass after blending was transferred to a heating-tumbling mixer (such as the preferred screw conveyor trough) for the final heat conditioning step. I have found that the whole operation may be made continuous, particularly when using the screw conveyor trough arrangement, so that proportioning feeders may be used to continuously feed into the lower end of the trough the constituent food materials, where the revolving screw mixes and blends continuously, and conveys the blend into the radiant heat zone of the conveyor where the surface moisture is evaporated from the ever-changing surfaces of the granules or clusters which are brought into the heat rays. All of the following specific examples may be carried out as continuous operations, as here described, with the final dry granular clustered or agglomerated products discharged from the upper end of the conveyor trough. Other tumbling means may be employed, with applied radiant heat and air circulation.

The following specific examples will serve further to illustrate the practice and advantages of my invention.

*Example 3.—Tomato Paste Base*

Two parts by weight of tomato paste containing 46 percent by weight of solids and two parts by weight of a modified potato starch were taken. The starch had a viscosity 38 percent of that of unmodified potato starch. The starch was placed in a blender. The tomato paste was added gradually while the blender was in operation. Blending was continued until the mix, which initially was a plastic, doughy type of mix, started to granulate and began to lose its tackiness. The blender employed was an ordinary vertical blender, but in cases where large quantities are used, it would be preferable to use a muller type of mixing device. At this stage any seasoning, salt, flavoring material, and the like, may be added, for examples sodium glutamate and salt. Specifically four ounces of salt and one-half ounce of sodium glutamate were added per four pounds of tomato paste and starch. An antioxidant may also be added at this stage to preserve the red color of the tomato paste. A suitable antioxidant is ascorbic acid. Others approved by the Food and Drug Administration may be used and are well-known to those skilled in the art.

At the end of the blending step the granular mass was then subjected to a thermal conditioning step. Large lots of the blended mass were fed into a screw conveyor, and subjected to radiant heat while being tumbled to continually bring fresh surfaces under the infra-red heat lamp. At no time was the mass heated over about 180° F. Preferably the mass heated to about 120° to 140° F. By employing a vacuum a lower temperature may be used, e.g. 90° F. The moisture content is reduced from an initial value of about 30 percent down to a final value of 2 to 8 percent.

The starch may be replaced in whole or in part by a sugar, preferably a low solubility sugar such as lactose, and a similar tomato product results. The dispersibility of the product in warm water is improved when a sugar replaces at least part of the starch.

By these means a free-flowing, granular product was produced which dispersed very readily in water at 150° F. The product was suitable as a base for cream-style soups and other soups, sauces (e.g., spaghetti sauce or barbecue sauce) and gravies.

*Example 4.—Pudding Base*

To 680 parts by weight of sucrose and 68 parts by weight of lactose, are added 1,252 parts by weight of water. The mixture was heated until clear, thereby forming a thick syrup which was kept warm to prevent crystallization of sugars. 908 parts by weight of standard, unmodified potato starch were placed in a blender. 460 parts by weight of the above syrup were added to the starch in the blender while the latter was operating. After a time the mass fluffed up and formed a characteristic granular, slightly moist, slightly tacky mixture. It was then put through the thermal conditioning process described in Example 3.

A granular product results which is free-flowing and resistant to deterioration by absorption of atmospheric moisture and which is dust-free. The product can be packaged in small packages with high speed packaging machinery without creating a dust, and it can be stored in bulk under ordinary conditions without deterioration due to absorption of moisture. The granular product, when added to hot water, gelatinizes very rapidly without forming lumps. It is useful as a pudding base and as a thickening agent in many products such as sauces, gravies and hot chocolate.

*Example 5.—Pudding Base*

Another material suitable for use as a pudding base can be prepared as follows: 454 parts by weight of heavy glucose syrup (80 percent solids), 227 parts by weight of water, 20 parts by weight of propylene glycol and 80 parts by weight of lactose were mixed together to form a viscous syrup. 470 parts by weight of this syrup are mixed with 900 parts by weight of standard, unmodified potato starch. The ingredients are blended until a granular, slightly moist, slightly tacky mass is produced which is then subjected to thermal conditioning in the manner described in Example 3. The product is a free-flowing, dust-free material which is resistant to deterioration by moisture and is useful as a pudding base and for other similar purposes. Sorbitol and mannitol may be substituted for the glucose syrup, to give similar products.

*Example 6.—Cocoa Mix*

24 parts by weight of powdered sugar, 8 parts of cocoa containing 15 percent of cocoa fat, a small seasoning quantity of salt, and 10 parts of whey powder were added to a blender. A sugar syrup (alternatively glucose or sucrose) of 72 percent strength was added in the amount of 12 parts by weight. These ingredients were then mixed and heated, and 2 parts by weight of powdered whey containing some butter fat were added. Heating was continued until the whey became partially caramelized.

This syrup was then added to the blender and heated to 170° F. The mass fluffed up and became gummy, then broke down into pellets which were easily broken to granules. These granules were then subjected to thermal conditioning in the manner described above. A granular product was obtained which has the properties noted above, i.e., free-flowing, dust-free, and resistant to deterioration from atmospheric moisture. It disperses instantly in either cold or hot water. It can be ground to 80 mesh and still dissolve very rapidly. It can be used for instant cocoa and is adapted to be vended in a vending machine wherein a measured quantity of the dry granular powder is dispensed into a cup to which hot or cold water, usually hot water, is added. No mixing is required other than that which is incident to the turbulence created by pouring in the water.

In Example 6, part or all of the water may be replaced by glycerine.

One of the most noteworthy properties of the products of the character described is that, when starch is used as a major ingredient, the product disperses very readily in water without lumping and without the necessity of stirring or of cooking. By approprite selection of the starch, the product can be made to disperse readily in either hot or cold water and to form a thick gel, a thin liquid or an intermediate product. Unmodified starches are pregelatinized starches are suitable for pudding bases and modified starches which disperse in water to form systems of low viscosity are suitable for hot soup mixtures.

The advantages of the invention in connection with utilization of starch in food products is strikingly shown in mixtures such as described in the above examples in which the starch is pregelatinized. As is well-known, when pregelatinized starch is added to water it gels and lumps very quickly and forms a hard rubbery mass which is wholly unsatisfactory for food purposes. In my products containing pregelatinized starch combined with other water-soluble or water-dispersible food products such as tomato paste solids, cocoa or sugar, and blended and heat treated in the manner described, the behavior in strikingly different. When the product is added to water, it disperses very readily to form a viscous gel which can be very easily stirred, poured and handled.

The products of Examples 3 to 6 are suitable bases for the preparation of other food products. Thus, salt, seasoning and flavoring material may be added. Such materials may be added to the dispersion or gel formed from the products of Examples 3 to 6; or they may be added during the manufacture of the products of Examples 3 to 6. For example, seasoning, flavoring material, and/or food dyes may be added to the granular mix after the blending step or during the thermal conditioning step, or they may be added to one or more of the major ingredients before or during blending. For example, salt and sodium glutamate may be added during blending in Example 3; propylene glycol, glycerine or sorbitol may be added during blending in Example 4 to act as plasticizers if the granules are too hard; and the propylene glycol in Example 5 is an excellent solvent for alcohol soluble flavoring materials. Milk solids or condensed milk or cream may be added during blending to impart a milk flavor to cocoa mixes, soup bases and the like.

As stated above, my process is also applicable to the making of beverage concentrates. Such concentrates may be effervescent or noneffervescent, and they may be of dietetic type (low in sugar) or of nondietetic type (high in sugar). The following examples will serve to illustrate the application of my invention to such beverage concentrates.

*Example 7.—Nondietetic Carbonated Soft Drink Beverage*

80 to 85 parts by weight of sucrose of quickly soluble, baker's special type and 10 to 15 parts of citric acid were added to a muller. (Whenever used herein "parts" refers to parts by weight unless otherwise indicated.) Operation of the muller was commenced and 3 to 5 parts of a refined corn syrup were added. Orange concentrate may be substituted for part of the corn syrup. Coloring matter was added to the syrup, for example, any of the standard food colors such as FDC Yellow No. 5 or No. 6. A flavoring material such as oil of orange or orange concentrate may also be dispersed in the syrup but preferably it is added at a later stage. Preferably an edible emulsifying agent such as sorbitan-mono-oleate or fatty acid glycerides may also be added. The emulsifying agent functions to emulsify the flavoring agent. Mixing was continued until the citric acid and sucrose crystals were completely and uniformly coated with the syrup. Then 10–12 parts of granular or powdered sodium bicarbonate were added and mixing continued. Within a short time, usually about 5 to 10 minutes, the mass fluffed up. Mixing was continued until the fluffed-up mass subsided. Generally, subsidence occurred about 12 to 15 minutes after the mass first fluffed up. This subsidence usually occurs very suddenly, and mixing was discontinued.

The mass was then thermally conditioned as above described. The mass in the muller was transferred to the screw conveyor. The screw conveyor moves the mass along and tumbles it as it moves, thereby exposing it uniformly to the heat. During this heat treatment and tumbling action in the conveyor, a flavoring material may be added. If the flavoring material is rather volatile it is preferably added near the outlet end of the conveyor. Alternatively, the flavoring material may be added to the mass after completion of the heat treatment and mixed with the solid material in a simple mixer.

The material thus produced may be stored in fiberboard drums having steel lids closed with ordinary tightness. Prior to packaging the material in retail packages, it is preferably screened or run through a comminuting device to break up lumps. The material, if properly prepared, has no tackiness at temperatures up to 100° F., but like many powdered or granular materials, it forms soft, easily broken, friable lumps which can be easily broken up prior to packaging.

*Example 8.—Dietetic Carbonated Soft Drink Beverage*

The procedure of Example 7 was followed but the mixture was modified as follows to provide a dietetic beverage. 100 parts of citric acid were placed in a muller followed by 4–10 parts of 70 percent sorbitol syrup in which a suitable coloring agent was dissolved. 5 parts of sodium cyclamate solution and 3 parts of saccharin were also added. 5 parts of a powdered, partially converted dextrin gum were also added to improve tackiness. The sorbitol syrup used in this beverage is not as efficient as a tackiness agent as the corn syrup of Example 7. Mulling is commenced and, when a uniform coating of the solid particles is achieved, 90 parts of granular or powdered sodium bicarbonate are added. Mulling is then continued until fluffing up and subsidence have occurred and the mass is then subjected to heat treatment as in Example 7.

Instead of preparing a soup product as in Example 3 above, a soup concentrate may be prepared as follows:

*Example 9.—Soup Concentrate*

A conventional cream style soup powder was employed as the starting material. A typical soup powder may contain pre-gelatinized starch, powdered milk, seasoning, a flavoring material such as powdered chicken meat, and fats. To 100 parts of a soup powder of this character were added 5 to 20 parts of citric acid. A muller was employed for mixing. Then 5 to 20 parts of corn syrup (or alternatively a mixture of sorbitol syrup and dextrin gum) were added. Then 5 to 20 parts (an excess) of sodium bicarbonate were added. Mixing was continued until fluffing up occurred. The mass was removed from the muller before subsidence occurred and was heat treated in the manner described above. This product has properties similar to those of Example 3.

In Examples 7, 8 and 9, I have described the new use of a food acid such as citric acid, with sodium bicarbonate, to produce a "fluffed-up" condition during the blending stage prior to thermal conditioning. This produces an improved texture in the agglomerated mass which facilitates the drying of the surface moisture from the clusters of material. Advantage may be taken of this in other mixtures such as those described in Examples 1 to 6, using the proportions of food acid and sodium bicarbonate which will react completely to produce the desired fluffing.

My new process is thus seen to be applicable to initial food mixtures containing solids to liquids in the weight ratio range from 24:1 to 1:1.

It is therefore apparent that a novel method is provided for preparing food and other concentrates in dry, granular form, and that novel products are provided. These products have important advantages such as resistance to moisture, resistance to dust formation and quick solution or dispersion in water. These products have good storage properties; they have good packaging properties (e.g., no stickiness yet very little tendency to form a dust); they dissolve very quickly and with a minimum of agitation in water; and they provide food concentrates with high quality flavor.

As used in the following claims, the phrase "water-dispersible" as applied to the ingredients of my composition is intended to embrace ingredients which are soluble (e.g., soluble sugars such as sucrose), or which absorb or adsorb water, or which can be dispersed in water (e.g., starch and many proteinaceous materials).

I claim:

1. The process of preparing a composite food product which is characterized by being granular, dry-surfaced, friable, readily re-dispersible in water, and non-hygroscopic, which comprises the steps of blending together (1) a substantial proportion of a normally dry food powder which is characterized by becoming a thickening adhesive agent when moistened; (2) a substantial proportion of a different food material which is liquid dispersible; and (3) a dispersing liquid for said different liquid-dispersible food material; the weight ratio of solids in ingredients (1) plus (2) to the liquid ingredient (3) being selected in the range from 24:1 to 1:1 to produce when blended together a mass of granules and agglomerated particles having surface moisture; and subjecting the moist surfaces of said granules and agglomerated particles to radiant heat while continuously tumbling and breaking up the mass and removing the water vapor until the said surfaces become non-tacky, the total moisture content of the mass is reduced to a value not in excess of about 10 percent based upon the whole weight of the mass, the temperature of the product during the drying being limited to the range from 75° to 180° F.

2. The process defined in claim 1 in which the blended mixture prior to drying is fluffed up by the addition thereto of chemically reactive quantities of food acid and sodium bicarbonate.

3. The process defined in claim 1 in which the normally dry food powder is selected from at least one member of the group consisting of a starch product; a sugar; a proteinaceous food derivative having when moistened adhesive, binding, and thickening properties; a mixture of a starch product and a sugar; a mixture of a starch product and a proteinaceous food derivative having when moistened adhesive, binding, and thickening properties; and a mixture of a starch product, a sugar, and a proteinaceous food derivative having when moistened adhesive, binding and thickening properties.

4. The process defined in claim 1 in which the liquid-dispersible different food material is selected from the group consisting of tomato solids, citrus juice solids, pureed fruit solids, pureed vegetable solids and milk solids.

5. The process defined in claim 1 in which the dispersing liquid is selected from at least one of the group consisting of water, glycerine, propylene glycol, aqueous syrup or sorbitol, glucose, invert sugar, and molasses.

6. The process of preparing a composite food which is characterized by being granular, dry surfaced, friable, readily redispersible in water, and non-hygroscopic which comprises the steps of blending together substantial proportions of (1) a normally dry food powder which is characterized by becoming a thickening adhesive agent when moistened; and (2) a different food material which is dispersed in a liquid; the proportion of total food solids to liquid being selected in the range from 24:1 to 1:1 to produce when blended a mass of granules and agglomerated particles having surface moisture; and subjecting the moist surfaces of said granules and agglomerated particles to radiant heat while continuously tumbling and breaking up the mass and removing the water vapor until said surfaces become non-tacky and the total moisture content of the mass is reduced to a value not in excess of about ten percent based upon the whole weight of the mass, the temperature of the product during the drying being limited to the range from 75° to 180° F.

7. The process defined in claim 6 in which the blended mixture prior to drying is fluffed up by the addition thereto of chemically reactive quantities of food acid and sodium bicarbonate.

8. The process defined in claim 6 in which the normally dry food powder is selected from at least one member of the group consisting of a starch product; a sugar; a proteinaceous food derivative having when moistened adhesive, binding, and thickening properties; a mixture of a starch product and a sugar; a mixture of a starch product and a proteinaceous food derivative having when moistened adhesive, binding and thickening properties; and a mixture of a starch product, a sugar, and a proteinaceous food derivative having when moistened adhesive, binding and thickening properties.

9. The process defined in claim 6 in which the liquid-dispersible different food material is selected from the group consisting of tomato paste, orange concentrate, lemon concentrate, pureed fruit, pureed vegetable, condensed whole milk, condensed skim milk, condensed cream, condensed whey, single-strength cream, and half-and-half milk and cream.

10. The process defined in claim 6 in which the dispersing liquid is selected from at least one of the group consisting of water, glycerine, propylene glycol, sorbitol syrup, glucose syrup, invert sugar syrup, and molasses.

11. The process defined in claim 6 in which the normally dry food powder is a starch product, and the liquid-dispersed different food material is a concentrated aqueous dispersion of tomato solids.

12. The process defined in claim 6 in which the normally dry food powder is a mixture of a starch product and a sugar, and the liquid-dispersed different food material is a concentrated aqueous dispersion of tomato solids.

13. The process defined in claim 6 in which the normally dry food powder is modified potato starch, and the liquid-dispersed different food material is tomato paste.

14. The process defined in claim 6 in which the normally dry food powder is pregelatinized starch.

15. A method of preparing a dry, friable, readily water-dispersible, nonhygroscopic tomato product which comprises providing substantial proportions each of (1) starch in dry solid form and (2) a concentrated aqueous dispersion of tomato solids; adding said aqueous dispersion of tomato solids gradually to said starch with mechanical agitation to form an intimate mixture thereof; and subjecting said intimate mixture to mild heat at temperature in the product of not more than 180° F. accompanied by mechanical agitation to reduce its moisture content to a value not in excess of about ten percent of the weight of the mixture; thereby forming a non-tacky, friable tomato solids mixture containing a substantial proportion of tomato solids, said mixture being readily dispersible in water without lumping and being nonhygroscopic.

16. The method of claim 15 wherein said mild heating and mechanical agitation are carried out at substantially atmospheric pressure.

17. As a new article of manufacture the product obtained by the process of preparing a composite food which is characterized by being granular, dry surfaced, friable, readily redispersible in water and non-hygroscopic, which comprises the steps of blending together substantial proportions of starch and tomato paste; the proportion of total food solids to liquids being selected in the range from 24:1 to 1:1 to produce when blended a mass of granules and agglomerated particles having surface moisture; and subjecting the moist surfaces of said granules and agglomerated particles to radiant heat while continuously tumbling and breaking up the mass and removing the water vapor until said surfaces become nontacky and the total moisture content of the mass is reduced to a value not in excess of about ten percent based upon the whole weight of the mass, the temperature of the product during the drying being limited to the range from 75° F. to 180° F.

References Cited in the file of this patent

UNITED STATES PATENTS

| | | |
|---|---|---|
| 2,380,036 | Flosdorf | July 10, 1945 |
| 2,391,829 | Huber | Dec. 25, 1945 |
| 2,856,288 | Peebles | Oct. 14, 1958 |
| 2,856,290 | Peebles | Oct. 14, 1958 |
| 2,868,646 | Schapiro | Jan. 13, 1959 |

FOREIGN PATENTS

| | | |
|---|---|---|
| 3408 of 1899 | Great Britain | Apr. 15, 1899 |
| 216,785 | Australia | Aug. 28, 1958 |